3,205,179
PROCESS FOR THE ACTIVATION OF DEHYDROGENATION CATALYSTS
Frederick J. Soderquist, Essexville, James L. Amos, Midland, and Harold D. Boyce, Coleman, Mich., assignors to The Dow Chemical Company, Midland, Mich., a corporation of Delaware
No Drawing. Filed July 14, 1961, Ser. No. 124,008
4 Claims. (Cl. 252—430)

The present invention relates to an improved process for the activation of metal oxide dehydrogenation catalysts and is concerned particularly with certain self-regenerative metal oxide catalyst compositions which are especially suitable for the dehydrogenation of ethyl benzene, m-ethyltoluene or p-ethyltoluene to produce the corresponding vinyl monomers.

The self-regenerative catalyst compositions contain, as active ingredients, a major proportion of one or more metal oxide catalysts of the group of oxides of iron, magnesium, zinc and mixtures of the foregoing, and a minor proportion of at least one other constituent which is an alkali promoter. Such promoters are usually employed in amounts from about 0.5 to about 30 percent by weight of the catalyst composition. Specific examples of the alkali promoters are alkali metal oxides and alkali metal containing compounds that yield an alkali metal oxide when heated at temperatures up to about 1000° C. Other optional minor components that can be employed include up to about 30 percent by weight of the catalyst composition of promoters containing copper, cadmium, thorium and/or silver as well as the free metals and up to about 20 percent by weight of a stabilizer of the group of oxides of aluminum, magnesium, beryllium, calicum, barium, strontium, chromium, bismuth, tin and alkali metal chromates and mixtures of any of the foregoing. For examples of such catalyst compositions, see the teachings of United States Letters Patents Nos. 2,414,585 and 2,461,147.

In addition to the active ingredients described above, the catalyst compositions generally contain small amounts of a cementitious component and possibly an extrusion aid such as a methyl cellulose ether.

Conventionally in the fabrication of a finished catalyst product, the dry catalyst components are mixed with a suitable refractory-type cement, e.g., alumina cement, and sufficient water to provide a readily extrudable mass or paste. Most catalyst preparations are then extruded as a continuous ribbon or rod which is cut into short pieces to form pellets of the catalyst composition. The pellets are dried at temperatures above 50° C. up to 200° C. in order to remove excess water and to complete the setting of the cementitious component. It has also been a common practice to activate the dried catalyst pellets by heating them up to the temperature at which they are going to be employed or higher temperatures up to their sintering temperature. The latter operation is often termed "calcining."

In the present invention, it has been discovered with regard to the calcining operation that unexpected advantages and benefits are obtained when a self-regenerative, dehydrogenation catalyst composition is formulated with a minor proportion of a carbonaceous material and thereafter is subjected to a treatment which comprises the steps of (1) heating the catalyst composition containing the carbonaceous material at a temperature above 200° C. up to about the temperature at which it is employed in the dehydrogenation reaction, e.g., from about 600° to about 650° C., with the simultaneous subjection thereof to an atmosphere containing at least a major proportion by weight of steam for at least 30 minutes and (2) thereafter roasting the catalyst composition in the presence of the atmosphere generated in the foregoing step at a temperature above about 800° C. and below about 980° C. for a period of time from about 2 up to 24 hours. By "atmosphere" is meant the total gas over the system regardless of its pressure.

While the activating operation can be conducted at lower or higher pressures, it is usually carried out under atmospheric pressures. The steam employed is conveniently saturated steam at atmospheric pressure that has been heated to the treating temperature.

The time required for accomplishing the steam pretreatment of the catalyst composition containing the carbonaceous material varies from the specified lower limit up to as much as 12 hours or more depending upon the exact temperatures involved, the size of the catalyst bed and the like considerations. In any event, pretreatment with steam for about 24 hours is sufficient.

Carbonaceous materials that may be employed individually or in mixtures in the invention include carbon black, graphite, charcoal, powdered coal and organic materials which are essentially hydrocarbons. Preferred carbonaceous materials in the latter category are methyl cellulose ethers and, in particular, the methyl cellulose ethers described in United States Letters Patent No. 2,603,610 as having a viscosity in a 2 percent aqueous solution at 20° C. of from 300 to 7500 centipoises. The total amount of carbonaceous material employed can range from 1 to 25 percent by weight of the total catalyst composition prior to the calcining step.

To use the catalyst activated in accordance with the present invention, one or more hydrocarbons such as ethyl benzene, m-ethyltoluene and/or p-ethyltoluene are passed in the vapor form over the self-regenerative dehydrogenation catalyst at a reaction temperature between about 580° and 800° C. The effluent vapors are condensed whereby the desired dehydrogenation product is obtained. This condensate can then be resolved into its individual constituents which will be in part recyclable materials, in part by-products and in part an improved yield of the desired vinyl monomer. The non-condensible portion of the effluent vapors is recovered and analyzed to determine the extent and efficiency of reaction. The feed mixtures to such a catalytic dehydrogenation operation contain a considerable amount, e.g., at least 1 and usually from about 2 to 10 or more, but preferably from 2.5 to 5 parts by weight of steam per part of the hydrocarbon feed. The mixture can be heated to the reaction temperature in any of the usual ways. For instance, a liquid mixture of water in the hydrocarbon feed material can be heated to vaporize the same and the vapor mixture be fed to the reaction. Such vapor mixtures are usually employed at about atmospheric pressure, but sub- or superatmospheric pressures can be utilized if desired.

The following examples are illustrative of the present invention and should not be construed as limiting.

EXAMPLE 1

In a specific embodiment, a self-regenerative, dehydrogenation catalyst composition was prepared by dry blending 60 percent by weight of an active catalyst mixture containing equal amounts of ferric oxide and zinc oxide, 9 percent by weight of sodium dichromate as a stabilizer, 9 percent by weight of each cuprous oxide and potassium carbonate as promoters, 5.1 percent by weight of graphite, 4 percent by weight of a methyl cellulose ether containing about 29.5 percent by weight methoxyl groups and 3.9 percent by weight of an alumina cement. A 2 percent aqueous solution of the cellulose ether exhibited a viscosity of about 1500 centipoises measured at 20° C. The above dry blend was then mixed with sufficient water to provide a thick paste which was extruded, cut into pellets and dried at a temperature of about 110° C.

About 70 cubic centimeters of the dry, pelletized catalyst composition was placed in an electrically heated reactor equipped with appropriate steam and hydrocarbon metered feed systems, temperature control and condensing and recovery apparatus. Prior to carrying out the dehydrogenation reaction, the catalyst composition was subjected to a calcining schedule as set forth below:

*Table 1*

| Phase | Temperature Conditions | Steam | Time, hours |
|---|---|---|---|
| 1 | Room temperature to 200° C | None | 2 |
| 2 | 200° to 300° C | ___do___ | 2 |
| 3 | 300° to 600° C | 62.2 grams/hour | 4 |
| 4 | 600° to 900° C | None | 0.5 |
| 5 | 900° C | ___do___ | 12.0 |
| 6 | 900° to 650° C | ___do___ | 0.5 |

During the last 3 phases of the above operation, that is, roasting without steam flow above 600° C., care was exercised to maintain over the catalyst composition the atmosphere autogenously generated. Approximately 15 liters of a gas (with water vapor removed) was generated. During the steam pretreatment in phase 3, analysis of the gas from recovery apparatus, with water removed as a condensate, indicated a composition about as follows:

*Table 2*

| Component: | Weight percent |
|---|---|
| $H_2$ | 4.4 |
| $CH_4$ | 0.8 |
| $CO$ | 25.8 |
| $C_2H_6$ | 0.2 |
| $CH_3OH$ | 0.9 |
| $C_3H_6$ | 0.1 |
| $CO_2$ | 67.8 |

Upon cooling the catalytic bed to 650° C., ethyl benzene was charged thereto at a rate of about 32.7 grams per hour in the presence of steam simultaneously charged at a rate of 62.2 grams per hour. The mixture was passed over the catalyst bed for a period of 314 consecutive hours during which period of time the operating temperature level was adjusted so as to obtain about 40 percent conversion to styrene per pass. The temperature at this conversion level was about 635° C. During the entire operation, a total of 10,256 grams of ethyl benzene and 19,513 grams of steam were introduced to the catalyst bed. Recovered were 9,707 grams of a crude hydrocarbon liquid product and 40.529 cubic feet (R.T.P.) of a non-condensible gas. The liquid product analyzed:

*Table 3*

| Component: | Weight percent |
|---|---|
| Benzene | 0.61 |
| Toluene | 0.98 |
| Ethylbenzene | 57.95 |
| Styrene | 40.2 |
| Tars | 0.26 |

The non-condensible gaseous product analyzed:

*Table 4*

| Component: | Weight percent |
|---|---|
| $H_2$ | 92.66 |
| $CH_4$ | 2.50 |
| $C_2H_4$ | 0.55 |
| $CO$ | 0.05 |
| $C_2H_6$ | 0.09 |
| $CO_2$ | 4.15 |

Utilizing the material balance method, the calculated conversion of ethyl benzene to styrene per pass was 40.4 weight percent with the ultimate yield of styrene based on recoverable and recyclable materials being 94.4 weight percent.

For purposes of comparison, conventional and other calcining schedules suggested in the art were utilized to activate an identical catalyst composition. In one such operation, phases 4 through 6 of the above-described calcining operation were omitted. A dehydrogenating test run similar to that above was conducted for about 600 hours. But for the catalyst pretreatment, operating conditions, e.g., feed rate, temperature and conversion per pass, were identical to those existing during the above-described run. Calculations based on the data obtained indicated an ultimate yield of styrene of about 91.1 percent.

In another operation, an identical catalyst composition was heated from room temperature to 900° C. in about 2 hours and maintained thereat for about 12 hours. No steam was employed at any point in the roasting cycle. Under dehydrogenating conditions identical to those employed in the first run within experimental limits, the ultimate yields of styrene obtained for two separate runs were 93.4 and 93.3 percent, respectively.

In a third comparative operation, an identical composition was calcined in a manner similar to that of the first composition described except that phases 4–6 of the calcining operation were carried out in the presence of steam. This composition was also employed to dehydrogenate ethyl benzene under conditions approximating those employed in the first run within experimental limits thereby providing an ultimate yield of styrene of 93.5 percent.

From a consideration of the foregoing results, it is apparent that a calcining or activation of the described catalyst compositions by processing them in the manner of the invention optimizes the yield of styrene or the like materials that are obtained in a dehydrogenation operation utilizing the catalyst so activated. While the improvement is just about one percentage point over that yield that may be obtained when the catalyst composition is activated by the best of the aforementioned comparative methods, this percentage point is about 17 percent of the total available improvement and thus is a significant improvement, especially in view of the volumes of hydrocarbons that are processed by this means.

In other operations, it was determined that hydrocarbons consisting of mixtures of m- and p-ethyltoluenes were similarly dehydrogenated in a more efficient fashion when the catalyst employed was calcined in the manner of the invention. The improvements obtained were up to 25 percent of the available improvement over identical catalyst compositions activated in accordance with the prior art.

What is claimed is:

1. A process for the activation of self-regenerative catalyst compositions consisting essentially of a major proportion of a metal oxide of the group of iron, magnesium and zinc oxides and mixtures of the foregoing, and a minor proportion of at least one other constituent which is an alkali promotor, which method comprises the steps of incorporating into the above active catalyst composition from about 1 up to about 25 percent by weight of the catalyst composition of a carbonaceous material consisting essentially of carbon; heating the catalyst composition containing the carbonaceous material at a temperature within the range from about 200° C. up to about 650° C. with the simultaneous subjection thereof to an atmosphere containing at least a major proportion by weight of steam for a period of time of at least about 30 minutes and thereafter roasting the catalyst composition in the presence of the atmosphere autogeneously generated at a temperature within the range from about 800° to about 980° C. for a period of time from about 2 to about 24 hours.

2. The method as in claim 1 wherein the carbonaceous material employed consists of a material selected from the group of carbon black, charcoal, powdered coal, graphite and mixtures of the foregoing.

3. The method as in claim 1 wherein the carbonaceous material is a water-soluble alkyl cellulose ether.

4. A process for the activation of a self-regenerative catalyst composition consisting essentially of (1) a major proportion of a metal oxide selected from the group consisting of iron, magnesium and zinc oxides and admixtures of the foregoing, (2) from about 0.5 up to about 30 percent by weight of an alkali promoter selected from the group consisting of alkali metal oxides and alkali metal containing compounds that yield an alkali metal oxide when heated at temperatures up to about 1000° C., (3) up to about 30 percent by weight of a promoter selected from the group consisting of copper, cadmium, thorium, silver, compounds containing at least one of the foregoing metals and mixtures of the foregoing materials, and (4) up to about 20 percent by weight of the catalyst composition of a stabilizer selected from the group consisting of oxides of aluminum, magnesium, beryllium, calcium, barium, strontium, chromium, bismuth, tin, alkali metal chromates and mixtures of any of the foregoing which method comprises the steps of (A) incorporating into the above catalyst composition from about 1 up to 25 percent by weight of the catalyst composition of a carbonaceous material consisting essentially of carbon (B) heating the catalyst composition containing the carbonaceous material at a temperature within the range from about 200° C. up to about 650° C. with the simultaneous subjection thereof to an atmosphere containing at least a major proportion by weight of steam for a period of time of at least about 30 minutes and (C) thereafter roasting the catalyst composition in the presence of the atmosphere autogeneously generated at a temperature within the range from about 800 to about 980° C. for a period of time from about 2 to about 24 hours.

References Cited by the Examiner

UNITED STATES PATENTS

| | | | |
|---|---|---|---|
| 2,184,235 | 12/39 | Groll et al. | 260—668 |
| 2,259,961 | 10/41 | Myddleton | 260—449.6 |
| 2,693,481 | 11/54 | Fellows | 260—449.6 |
| 2,729,664 | 1/56 | Kirshenbaum | 260—449.6 |
| 3,084,125 | 4/63 | Soderquist et al. | 252—430 |

MAURICE A. BRINDISI, *Primary Examiner.*

ALPHONSO D. SULLIVAN, *Examiner.*